Figure 1:
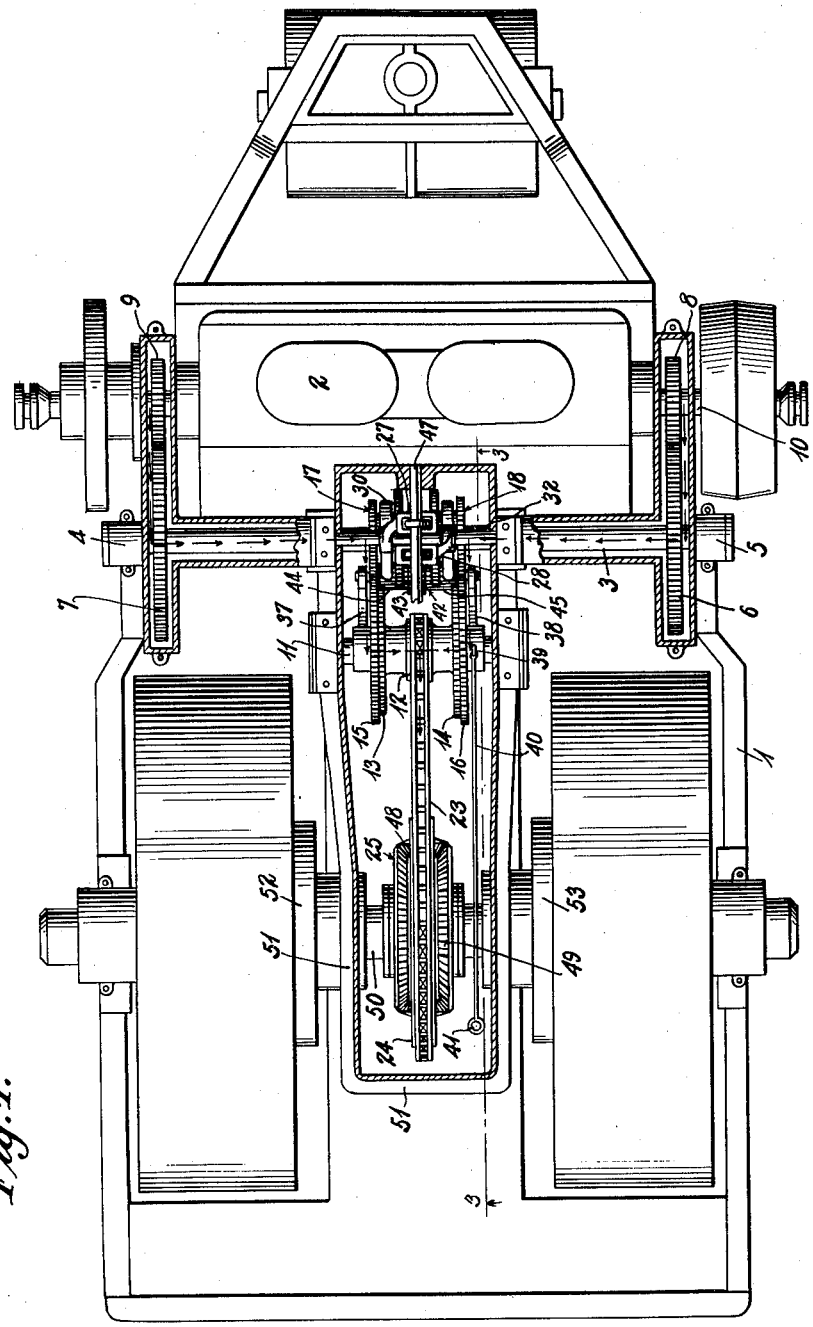

May 29, 1934. W. KNUDSEN 1,960,637
POWER TRANSMISSION GEAR FOR MOTOR VEHICLES
Original Filed June 18, 1929 3 Sheets-Sheet 1

Inventor
William Knudsen

By Knight Bros.
Attorneys

May 29, 1934.  W. KNUDSEN  1,960,637
POWER TRANSMISSION GEAR FOR MOTOR VEHICLES
Original Filed June 18, 1929  3 Sheets-Sheet 2
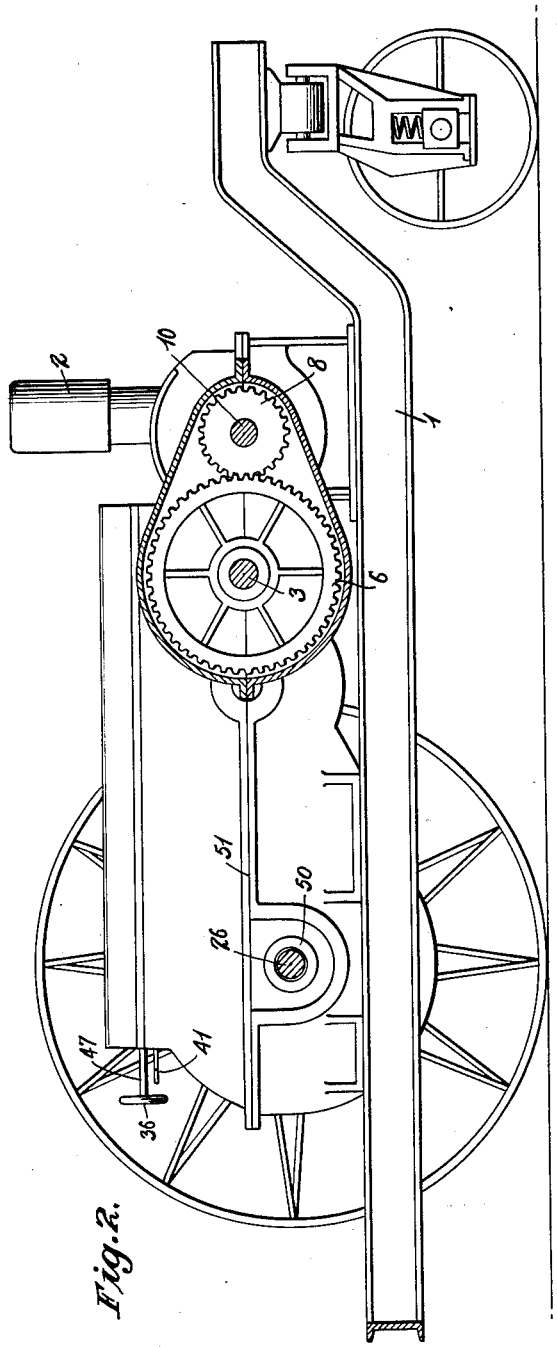
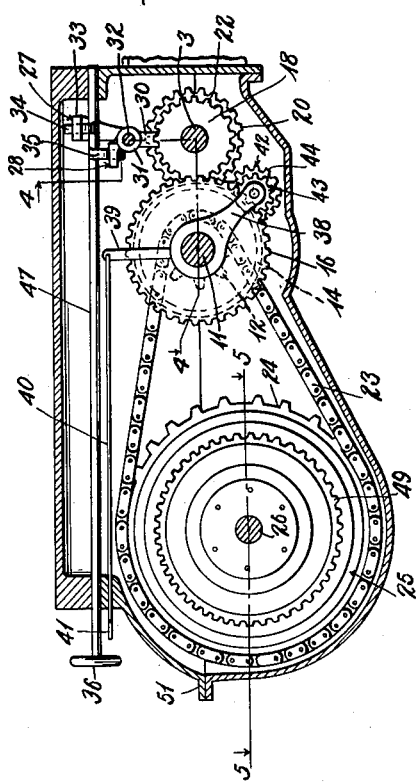
Inventor
*William Knudsen*
By *Knight Bros.*
Attorneys

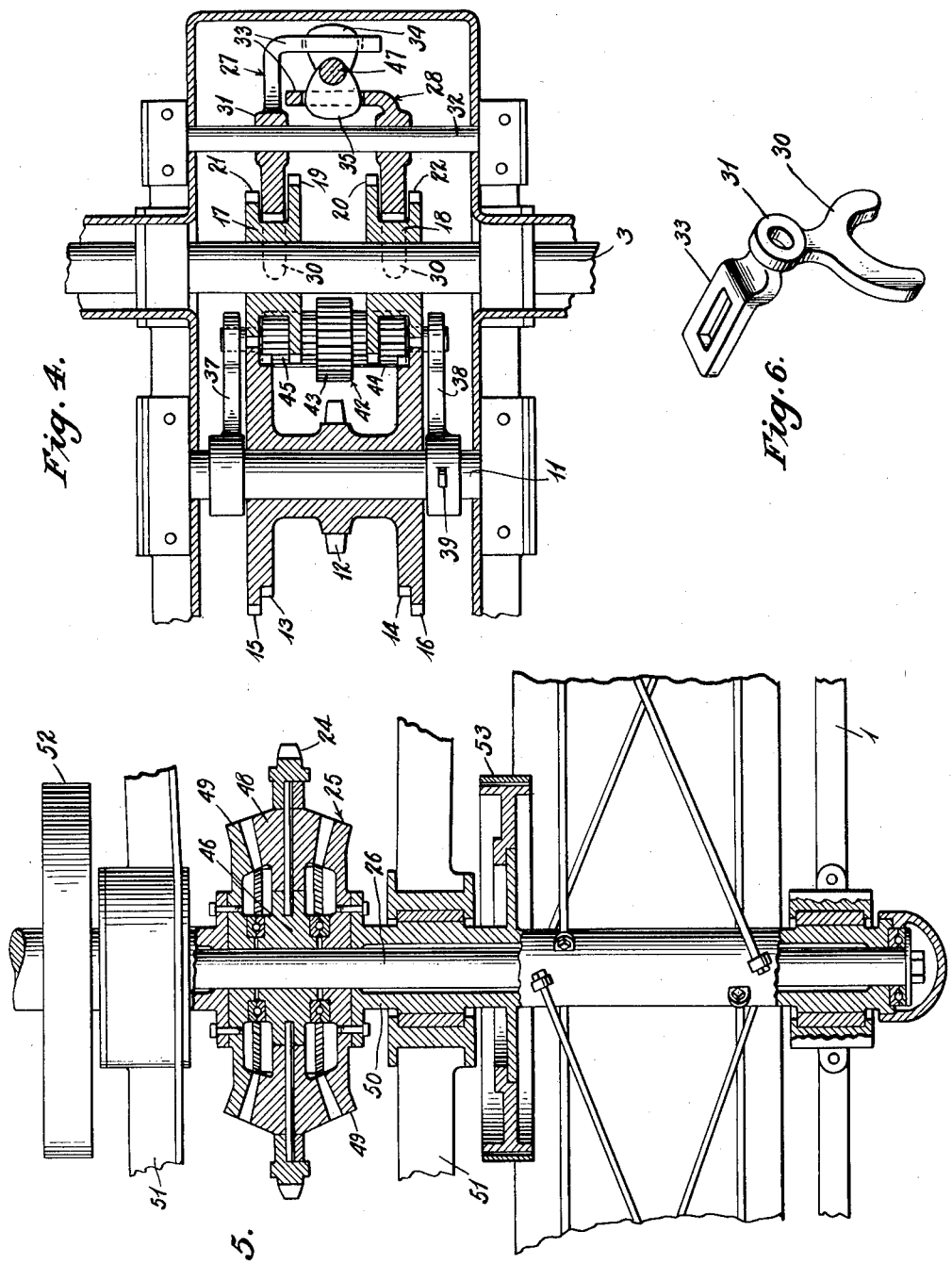

Patented May 29, 1934

1,960,637

UNITED STATES PATENT OFFICE 1,960,637

POWER TRANSMISSION GEAR FOR MOTOR VEHICLES

William Knudsen, Fremont, Nebr.

Application June 18, 1929, Serial No. 371,842
Renewed October 17, 1933

6 Claims. (Cl. 74—57)

This invention relates to transmission mechanism for motor vehicles and particularly to the mechanism adapted for use as a propelling means for tractors and the like of vehicles.

The main object of my invention is to provide a construction and arrangement in which the stresses occurring in the frame of a power driven vehicle will be equally distributed throughout this frame. Another object is to provide a speed change and reversing mechanism which will permit convenient and easy operation of the vehicle by maintaining this equal distribution of stresses.

By this equal distribution of stresses I am enabled to maintain a marked degree of constancy in the alignment of the power transmitting elements, thus insuring a longer life for these operating parts, and I obtain it by arranging the transmission gearing in such a manner that the resultant of the various forces occurring in the gears is constantly in a longitudinal axis of symmetry of the frame of the vehicle.

It is a further object of my invention to arrange my novel system of gearing in a compact form in order to allow the same to be effectively encased in an oil bath and protected from grit and dust.

In the accompanying drawings illustrating a preferred embodiment of my invention, Fig. 1 is a plan view of a tractor equipped with a transmission mechanism according to my invention, the cover of the gear housing being removed, Fig. 2 is a side elevation of the tractor, the gear housing cover being in position, and the rear wheel being omitted, Fig. 3 is a vertical longitudinal section in larger scale, along line 3—3 of Fig. 1, Fig. 4 is a horizontal section through the gearing, along line 4—4 of Fig. 3, Fig. 5 is a horizontal section through the differential, along line 5—5 of Fig. 3, and Fig. 6 is an isometric view of a gear shifter.

Referring now to the drawings, like numerals being used in the different views to indicate like parts, on frame 1 of a tractor is mounted a motor 2 whose shaft 3 is arranged transversely to the longitudinal axis of frame 1 and journaled in bearings 4 and 5. Gears 6 and 7, fastened to shaft 3 at points equidistant from the longitudinal axis of the frame, are constantly in mesh with gears 8 and 9 respectively, which are fastened to the motor shaft 10.

Parallel with and adjacent to shaft 3 there is arranged another shaft 11 on which is mounted a one part gearing composed of a sprocket 12, a pair of inner gears 13, 14 of like size and equidistant from said sprocket, and a pair of outer gears 15, 16, also of like size and equidistant from the sprocket. This one part gearing is mounted on shaft 11 in such a manner that sprocket 12 lies in the longitudinal center of the frame 1.

Besides gears 6 and 7, there are arranged on shaft 3 two double gears 17, 18 (see Fig. 4) in such a manner that they cannot turn around said shaft, but slide upon it in both directions. This can be accomplished in any convenient and conventional way, as, for instance, with slots and keys, or by making part of shaft 3 square, etc. The inside gears 19, 20 of these double gears are adapted to mesh with the inner pair of gears 13, 14 of the one part gearing, when the double gears 17, 18 are shifted outwardly. The outside gears 21, 22 of the double gears 17, 18 are adapted to mesh with the outer gears 15, 16 of the one part gearing, when the double gears 17, 18 are shifted inwardly. The ratio between the diameters of the outside gears 21, 22 and the outer gears 15, 16 is different from the ratio between the diameters of the inside gears 19, 20 and the inner gears 13, 14, and these two ratios of the change speed gearing correspond to two speed steps.

A drive chain 23 arranged in the longitudinal axis of frame 1 connects sprocket 12 with sprocket 24 of differential 25.

The change speed gear and the reverse gearing are constructed in the following manner: Two gear shifters 27 and 28 of similar shape, one of which is shown separately in Fig. 6, are mounted on shaft 32. Each of these shifters consists of a fork 30, reaching down between gears 21, 19 and 22, 20 respectively, thereby engaging these gears, of a sleeve 31 sliding on shaft 32, and of a frame 33. Frames 33 engage with cams 34 and 35 which are rigidly secured to shaft 47 which is mounted on the tractor frame and can be turned by the operator in any suitable and convenient manner, as for instance, by means of a hand wheel 36.

By turning this shaft 47, shifters 27 and 28 are moved upon shaft 32, whereby the double gears 17, 18 are drawn together, or moved apart, according to the direction in which shaft 47 is turned. In the former position (shown in Fig. 4) gears 21, 22 mesh with gears 15, 16 respectively, driving the tractor at low speed, whereas it will run with higher speed when 19 and 20 respectively mesh with 13 and 14 respectively, the doubled gears being in this case drawn apart and kept in this position by cams 34 and 35.

Two arms 37 and 38 are pivoted at the one end upon shaft 11, on either side of the one part gear. One of the arms 37 and 38, for instance, 38, has fastened to it an operating lever 39 which is connected to rod 40 with handle 41, as shown in Fig. 3. Journaled in the other ends of arms 37 and 38 is a composite pinion 42, consisting of a larger central gear 43 and of two smaller gears 44 and 45 on either side of 43. Central gear 43 is adapted to mesh with the sliding inside gears 19, 20, whereas the gears 44, 45 are constantly in contact with gears 13 and 14.

The reversing gear will be inoperative if the gears 21 and 22 respectively mesh with gears 15 and 16, whereby 19 and 20 are not in contact with 43 or, if the reversing gear is dropped by revolving arms 37 and 38 upon shaft 11, by means of lever 39 the reverse gear can be made inoperative no matter what the positions of the other gears are. If the double gears are shifted so far inwardly that 19 and 20 engage 43, thereby disengaging 21 and 22 from 15 and 16, respectively, and the reverse gear has been brought upward so that 43 engages 19 and 20, the tractor will run in the reverse gear.

The wheel drive consists of a differential body 46, rigidly connected to shaft 26, of planetary bevel pinions 48 with bevel gears 49 and central sprocket 24, as already described, gears 49 being rigidly connected to the hollow shaft 50 which is journaled in the truck frame 1 and in the gear frames 51.

Mounted on shaft 50 are brake drums 52 and 53.

In Fig. 1 of the drawings there is indicated by lines of arrows the path which the energy takes from the motor 2 to the driving axle 26. The power is taken from the motor shaft 10 at two points equidistant from the longitudinal axis of the frame 1, and passes into shaft 11 from shaft 3 at two points also equidistant from the longitudinal axis of the frame 1. Drive chain 23 takes up the drive from the shaft 11 at the point located in the longitudinal axis of said frame and transmits it along this longitudinal axis of frame 1 to a point associated with driving axle 26, also located in the longitudinal axis of the frame.

Having described my invention, I claim:

1. In a motor driven vehicle, a change speed gearing arranged on two parallel shafts and consisting of a one part gearing mounted on one of said two shafts and composed of a sprocket at substantially its mid-point, a pair of inner gears of like size and equidistant from said sprocket and a pair of outer gears of like size and equidistant from said sprocket, said inner gears being of a different size from said outer gears, and two double gears shiftably splined on the other of said two shafts, the inside gears of said double gears being adapted to mesh with said inner pair of gears and the outside gears of said double gears being adapted to mesh with said outer pair of gears when said double gears are shifted.

2. In combination with a mechanism according to claim 1, arms loosely mounted on the same shaft as said one part gearing, a composite pinion carried by said arms and consisting of a larger central gear and two smaller side gears, said central gear being adapted to mesh with the inside gears of said double gears, said side gears being constantly in mesh with the inner pair of gears of said one part gearing, and means for bringing said pinion into mesh with the inside gears of said double gears when the latter are out of contact with said one part gearing.

3. In combination with a mechanism according to claim 1, arms loosely mounted on the same shaft with, and at both sides of, said one part gearing, a composite pinion journaled in said arms consisting of a central larger gear and two smaller side gears constantly in mesh with the inner gears of said one part gearing, said central gearing being adapted to mesh with the inside gears of said double gears, means for shifting said double gears upon their shaft symmetrically to the axis of said sprocket, and means for turning said arms and pinion on the shaft of the one part gearing.

4. In combination with a device according to claim 1, a shifting mechanism consisting of a third shaft parallel to said gear shafts, a rotatable change speed control shaft with two cams, two gear shifters slidably mounted on said third shaft, each shifter being engaged by a cam and engaging a double gear, said control shaft being adapted to be turned, thereby shifting the double gears symmetrically to the longitudinal axis of the truck.

5. In a gear shift mechanism, a shaft, two double gears symmetrically arranged on said shaft, each double gear consisting of a larger and a smaller gear wheel, a rotatable control shaft having two cams extending in opposite directions, and two gear shifters each consisting of a sleeve surrounding said shaft, of a fork engaging said double gears, and a frame engaged by said cams.

6. In combination with a mechanism according to claim 1, a third shaft parallel to said shafts, a rotatable control member comprising two cams, two gear shifters slidably mounted on said third shaft, each of said gear shifters having a sleeve surrounding said third shaft, a member loosely engaging said double gears and a frame being loosely engaged by said cams, said gear shifters and said cams being adapted to move said double gears equidistantly from said sprocket when said control member is rotated.

WILLIAM KNUDSEN.